(No Model.)
G. W. HAINES.
HEADER AND THRASHER.
No. 413,139. Patented Oct. 15, 1889.
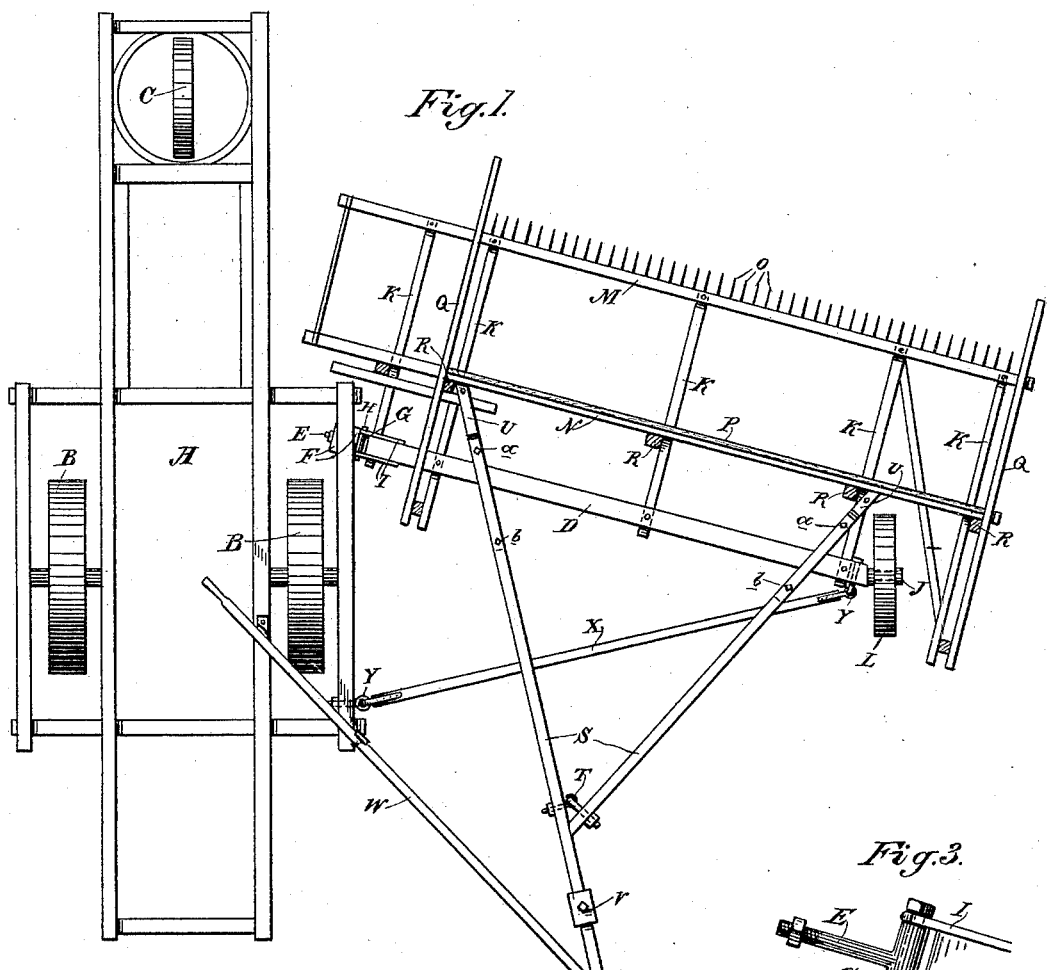
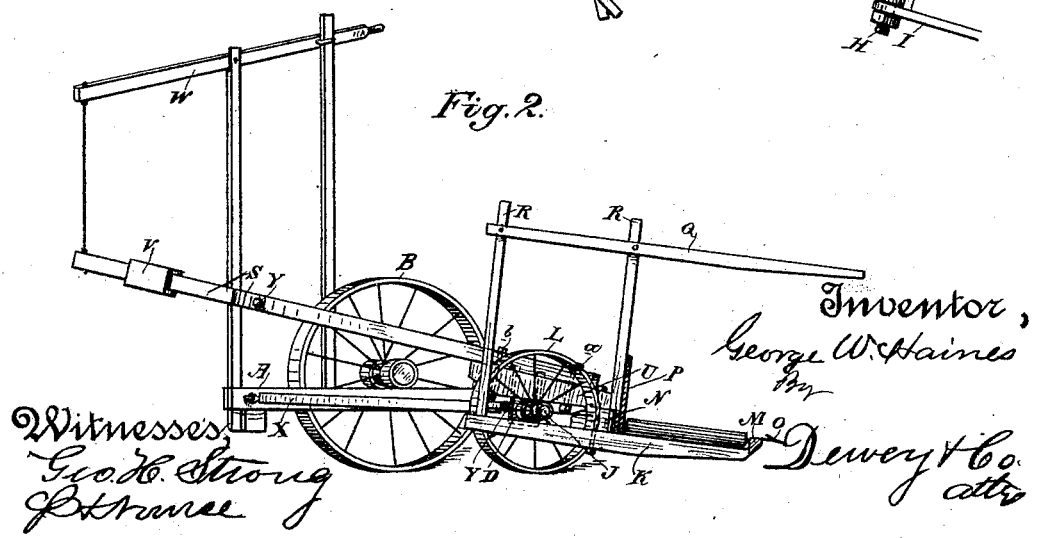
Witnesses:
Geo. H. Strong
J. H. Hume
Inventor,
George W. Haines
By Dewey & Co.
Attys

UNITED STATES PATENT OFFICE.

GEORGE W. HAINES, OF STOCKTON, CALIFORNIA, ASSIGNOR TO THE STOCKTON COMBINED HARVESTER AND AGRICULTURAL WORKS, OF SAME PLACE.

HEADER AND THRASHER.

SPECIFICATION forming part of Letters Patent No. 413,139, dated October 15, 1889.

Application filed July 12, 1889. Serial No. 317,331. (No model.)

*To all whom it may concern:*

Be it known that I, GEORGE W. HAINES, of Stockton, San Joaquin county, State of California, have invented an Improvement in Headers and Thrashers; and I hereby declare the following to be a full, clear, and exact description of the same.

My invention relates to certain improvements in that class of apparatus employed to cut, thrash, and clean grain while the apparatus is traveling about the field, being propelled by steam, horse, or other power; and it consists of details in the construction of the header portion of the apparatus and its attachment to the thrashing mechanism, which will be more fully explained by reference to the accompanying drawings, in which—

Figure 1 is a plan view. Fig. 2 is an elevation of the header-frame. Fig. 3 is a detail of the swivel-bolt.

A is the thrashing-machine frame, mounted upon bearing-wheels B, from which power is derived to propel the thrashing apparatus, the sickle, reel, and carrying-belt of the header, these devices not being shown in the present case, as forming no part of my invention.

C is the steering-wheel, upon which the front of the machine is supported.

I have only shown the thrashing-frame in the present case in outline, for the purpose of showing the attachments of the header which form my present invention.

D is a stout beam or timber, on which all of the header mechanism is supported. At the inner end this timber is secured to the right-hand timber of the thrashing-machine frame by a strong pivot-bolt E, which passes diagonally through the timber A and through beveled washers F so placed with reference to each other that their outer faces extend at right angles with the bolt E, so as to give a flat support for the nut which secures said bolt in place. The opposite end of the bolt E has a T-head G, and a bolt H passes through this head and through the straps I upon each side of the inner end of the timber D, thus forming a hinge-joint about which the timber may rise and fall, while the bolt E allows it to swivel or turn about said bolt when the timber D is turned for the purpose of raising or depressing the sickle. The inner end of the timber D is connected with the thrashing-machine frame at a point considerably in front of the axis of the main bearing-wheels B, and the outer end of this timber stands in line with this axis and has secured to it an axle J, upon which the outer bearing-wheel L turns. The extension of the axle J is bent so as to conform to the angular position of the bar D, to which it is strongly bolted, while the axle itself is in line with that of the wheels B.

K K K K K are timbers, the rear ends of which are strongly bolted to the movable timber D, and they extend forward at right angles with said timber to a distance sufficient to carry the sickle-bar M and the traveling belt or draper behind the sickle, upon which the cut grain falls and by which it is delivered to the thrashing-machine in the usual manner.

The fingers or guards O, through which the sickle reciprocates, are fixed in the guard-timber M, so as to extend at right angles with it, and as this timber is parallel with the timber D and inclining backwardly with reference to the timbers of the thrashing-machine and the line of travel of the machine, it will be seen that grain and material to be be cut by the sickle will strike these guards at an angle instead of directly in line with them. This is an important advantage in the construction of this machine, since the guards have in their movement through the grain a sort of sweeping motion which will lift up short and lodged grain and bring it back to the sickle in a position to be much more effectively cut than when the fingers or guards are in line with the direction of the travel and simply pass through the grain in a straight line. Experience has shown that this construction of the sickle saves a great deal of short and lodged grain which would otherwise be lost.

The timber N is framed to the timbers K parallel with D and M, and at such a distance from M as to admit the width of the carrying belt or draper which travels between these two timbers. Upon this timber N is erected the smooth vertical board P, which stands edgewise and has considerable depth, so that its stiffness in a vertical direction is very great. This board serves a double purpose. It takes the place of the wire screens which usually stand behind the carrying-belt to prevent the grain from passing over backward, and presents a smooth surface against which such grain as may strike it will move freely and will not be checked or stopped, as in the case where wire screens are employed. At the same time this board greatly assists in stiffening the machine and preventing its twisting out of shape in the direction of its length.

Q Q are the arms upon which the reel is journaled, these arms being supported upon the posts R, which extend up from the frame-timbers K in the usual manner.

It will be seen by this construction that the whole of the header-frame is supported upon the single timber D, and that by proper levers the front portion and sickle-bar may be raised and depressed by turning the timber D upon its axial points—the bolt E and the axle J—while the outer end of the frame is allowed to rise and fall to accommodate itself to inequalities of the ground by reason of the wheel L traveling over such inequalities and the hinged joint G at the inner end of the timber D. By this construction there is no angular frame to be hinged to the thrashing-machine or to have its outer end supported upon the bearing-wheel, and consequently there is no tendency to twist out of shape by reason of unequal strains.

In order to counterbalance the weight which is in front of the timber D, I employ the arms S, which have their rear ends united by the shackle or hook bolts, (shown at T,) while their front ends diverge and cross the timber D, so as to form with it a nearly equilateral triangle. The front ends of the timbers S are strongly bolted upon the supplemental timbers U, which are fixed across the timber D and two of the timbers K, and when the rear end of the triangle formed by the timbers S is depressed it will act to turn the main supporting-timber D, and thus raise the front end of the sickle-bar, while the reverse movement will depress the sickle-bar, the whole turning about its fulcrum-bar D. One of the timbers S is extended behind the joint at T, and upon this bar is fixed the movable balance or counter-weight V, which serves to counterbalance the weight of the header and make it easy to raise or depress it by means of the lever W, which is fulcrumed upon the thrashing-machine frame and has one end connected with the edge of the counterweight-lever S and the other extending inwardly from the thrashing-machine, so as be within reach of the operator.

In order to retain the timber D in its proper position relative to the thrashing-machine, and at the same time to allow it perfectly free movement without any twisting strain, I have shown a brace-beam X, the inner end of which is connected with the thrashing-machine frame by means of the two stout eyebolts Y, and the outer end is connected with the outer end of the timber D by two similar eyebolts. By the use of these eyebolts it will be seen that the timber D is perfectly free to turn upon its axis for the purpose of raising or depressing the front and sickle bar, and its outer end is also free to rise and fall to accommodate itself to inequalities of the ground without any strain whatever upon any portion, these swivel or eyebolt connections allowing these movements to be made, and in this my construction differs from all header-machines which are hinged or otherwise attached to the side of the thrashing-machine or to supplemental frames projecting from the thrashing-machines, as I have no dimension of width which may be subject to a twisting strain, but only the single pivoted fulcrum-bar D, upon which everything is supported. The manner in which the counterbalance-lever arms S extend across the timber D and are secured to the timbers K makes a very stiff and unyielding frame for the sickle and carrying-belt.

Whenever it is necessary to pass through gates, the header portion of these machines must be detached from the thrasher portion, which in this case is easily done by simply removing the nut from the pivotal bolt E and from the eyebolt which connects with the inner end of the brace-rod X. The timbers S are bolted to the timbers U at $a$ and $b$, the bolts extending through both timbers, and when it is necessary to pass through a gate one of the bolts $b$ is removed from each of the timbers S, and, the joint at T being unhooked, the two timbers S may be swung around upon the bolts $a$, which serve as fulcrums or pivots for them to turn on, so that they then lie approximately parallel with the timber D of the header-frame. The brace-rod X may be swung around in the same manner, and the header will then present a narrow construction. It is mounted upon a two-wheeled truck having a pole extending outwardly at one end, to which the team may be attached and the header hauled to any desired point, the thrashing-machine being also hauled separately.

Having thus described my invention, what I claim as new, and desire to secure by Letters Patent, is—

1. The combination, in a combined header and thrashing-machine, of a sickle and carrying-belt frame, a single timber to which this frame is secured, a diagonally-disposed combined hinge and pivot by which the inner end of said timber is adjustably connected with the thrashing-machine frame in front of the axis of the main bearing-wheels, a single bearing-wheel journaled to the outer end of said timber, with its axis in a vertical plane with the axis of the main bearing-wheels of the thrashing-machine, and a counterbalance frame and weight attached to and extending rearwardly from the fulcrum-bearing timber, substantially as described.

2. In a combined header and thrashing-machine, a single fulcrum-bearing timber D, supporting the sickle and carrying-belt frame of a header, having its outer end supported upon a wheel journaled in line with the main bearing-wheels of the thrasher and its inner end connected with the thrasher-frame A in front of said wheels by means of a pivot-bolt extending through said frame, the beveled washers F upon each side of the frame A, the T-head upon the bolt, and the hinge connecting it with the fulcrum-timber of the header-frame, substantially as described.

3. In a combined header and thrashing-machine, the header having a single fulcrum-timber, the outer end of which is supported upon a bearing-wheel in line with the axis of the main bearing-wheels of the thrasher and the forward end connected by a pivot and hinged joint with the thrashing-machine frame in front of said axis, the sickle and carrying-belt frame secured to and standing in front of the fulcrum-timber, and the counter-balance frame and weight extending rearwardly therefrom, in combination with the brace-rod X, having its inner end connected with the rear of the thrashing-machine frame by a loose or swivel joint and its outer end connected with the movable timber of the header-frame by a similar joint, substantially as described.

4. In a combined header and thrashing-machine, a header comprising a single timber standing diagonally outward from the thrashing-machine frame, having its outer end supported upon a bearing-wheel in line with the axis of the main bearing-wheels of the thrashing-machine frame, and the inner end connected with the side timbers of the thrashing-machine by a pivot and hinged joint, a sickle and carrying-belt frame secured to this fulcrum-timber, and counterbalance-levers extending rearwardly therefrom, in combination with a board P, secured to the header-frame timbers behind the carrying-belt and standing upon edge upon said timbers, substantially as described.

5. In a combined header and thrashing-machine, the header composed of sickle and carrying-belt frame-timbers secured to a single fulcrum-timber, a bearing-wheel by which the outer end of said timber is supported, and a pivot and hinged joint by which the inner end of said timber is connected with the thrashing-machine frame, timbers U, secured to said fulcrum-beam and the header-frame timbers, in combination with the lever-arms S, bolted to the timbers U, the loose or hook connection T, by which these levers are united, the operating-lever W, fulcrumed upon the thrashing-machine frame, having its outer end connected with the rear end of one of the levers S, and the brace-bar X, with the eyebolt-connections Y and Z, whereby its inner and outer ends, respectively, are united to the thrashing-machine and the fulcrum-beam of the header-frame, substantially as described.

In witness whereof I have hereunto set my hand.

GEORGE W. HAINES.

Witnesses:
W. T. JONES,
J. E. DUFF.